United States Patent
Paspulati et al.

(10) Patent No.: US 11,536,200 B2
(45) Date of Patent: Dec. 27, 2022

(54) NON-CONTACT SEAL ASSEMBLY IN GAS TURBINE ENGINE

(71) Applicant: Siemens Energy Global GmbH & Co. KG, Munich (DE)

(72) Inventors: Amit K. Paspulati, Charlotte, NC (US); Abdullatif M. Chehab, Chuluota, FL (US); Kai Kadau, Lake Wylie, SC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/634,459

(22) PCT Filed: Jun. 5, 2020

(86) PCT No.: PCT/US2020/036228
§ 371 (c)(1),
(2) Date: Feb. 10, 2022

(87) PCT Pub. No.: WO2021/034370
PCT Pub. Date: Feb. 25, 2021

(65) Prior Publication Data
US 2022/0268214 A1 Aug. 25, 2022

Related U.S. Application Data

(60) Provisional application No. 62/888,635, filed on Aug. 19, 2019.

(51) Int. Cl.
*F02C 7/28* (2006.01)
*F01D 11/02* (2006.01)
*F16J 15/44* (2006.01)

(52) U.S. Cl.
CPC ............... *F02C 7/28* (2013.01); *F01D 11/02* (2013.01); *F16J 15/44* (2013.01); *F05D 2220/32* (2013.01); *F05D 2240/55* (2013.01)

(58) Field of Classification Search
CPC .......... F02C 7/28; F01D 11/00; F01D 11/001; F01D 11/003; F01D 11/02; F01D 11/025;
(Continued)

(56) References Cited

U.S. PATENT DOCUMENTS

| 2016/0102570 A1* | 4/2016 | Wilson ................... F16F 15/06 277/411 |
| 2016/0109025 A1 | 4/2016 | McCaffrey et al. |

(Continued)

FOREIGN PATENT DOCUMENTS

| EP | 3415798 A1 | 12/2018 |
| WO | 2015147967 A1 | 10/2015 |
| WO | WO-2021021132 A1 * | 2/2021 ............. F16J 15/442 |

OTHER PUBLICATIONS

PCT International Search Report and Written Opinion of International Searching Authority dated Sep. 18, 2020 corresponding to PCT International Application No. PCT/US2020/036228 filed Jun. 5, 2020.

*Primary Examiner* — Woody A Lee, Jr.
*Assistant Examiner* — Elton K Wong

(57) ABSTRACT

A non-contact seal assembly for sealing a gap between relatively rotatable components in a gas turbine engine is presented. The non-contact seal assembly includes a primary seal having a radially movable seal shoe, a mid-plate, an aft secondary seal radially movable along with the seal shoe, a forward secondary seal and a U-shaped seal carrier for holding the components together using pins. The seal shoe includes a plurality of seal shoe segments. The aft secondary seal includes a plurality of aft secondary seal segments. Each aft secondary seal segment is attached to each seal shoe segment. Each aft secondary seal segment includes at least a notch at outer radial side to receive the pin for accommodating radial movement of the seal shoe segment.

17 Claims, 6 Drawing Sheets

(58) Field of Classification Search
CPC ......... F16J 15/44; F16J 15/441; F16J 15/442;
F16J 15/443; F16J 15/444; F16J 15/445;
F16J 15/447; F16J 15/4472; F16J
15/4474; F16J 15/4476; F16J 15/4478;
F05D 2220/32; F05D 2240/55
See application file for complete search history.

(56) References Cited

U.S. PATENT DOCUMENTS

| | | | |
|---|---|---|---|
| 2017/0051834 A1* | 2/2017 | Webster | F16J 15/4472 |
| 2019/0101014 A1* | 4/2019 | DiFrancesco | F01D 11/02 |
| 2019/0234240 A1* | 8/2019 | Smith | F16J 15/28 |
| 2020/0248810 A1* | 8/2020 | Virkler | F16J 15/445 |

* cited by examiner

NON-CONTACT SEAL ASSEMBLY IN GAS TURBINE ENGINE

TECHNICAL FIELD OF THE INVENTION

This invention relates generally to a non-contact seal assembly for sealing a gap between components in a gas turbine engine.

DESCRIPTION OF THE RELATED ART

An industrial gas turbine engine typically includes a compressor section, a turbine section, and a mid-frame section disposed therebetween. The compressor section includes multiple stages of compressor rotating blades and stationary vanes and an outlet guide vane assembly aft of the last stage blade and vane. The mid-frame section typically includes a compressor exit diffusor and a combustor assembly. The compressor exit diffusor diffuses the compressed air from the compressor section into a plenum through which the compressed air flows to a combustor assembly which mixes the compressed air with fuel and ignites the mixture and transits the ignited mixture to the turbine section for mechanical power. The turbine section includes multiple stages of turbine rotating blades and stationary vanes.

Gas turbine engines are becoming larger, more efficient, and more robust. Large blades and vanes are being utilized, especially in the hot section of the engine system. In view of high pressure ratios and high engine firing temperatures implemented in modern engines, certain components, such as stationary vanes and rotating blades, require more efficient cooling to maintain an adequate component life. Cooling may be accomplished by extracting a portion of the cooler compressed air from the compressor and directing it to the turbine section, thereby bypassing combustors. However, bleeding air from the compressor may reduce gas turbine engine performance and efficiency. Cooling air may leak through gaps between components in the gas turbine engine. Thus, there is a need to provide a robust seal assembly to seal the gaps in the gas turbine engine to reduce cooling air leakage.

SUMMARY OF THE INVENTION

Briefly described, aspects of the present invention relate to a non-contact seal assembly configured to seal a gap between a stator and a rotor rotatable relative to the stator in a gas turbine engine, a method for making a non-contact seal assembly to be used for sealing a gap between a stator and a rotor rotatable relative to the stator in a gas turbine engine, and a gas turbine engine.

According to an aspect, a non-contact seal assembly configured to seal a gap between a stator and a rotor rotatable relative to the stator in a gas turbine engine is presented. The non-contact seal assembly comprises a primary seal comprising a seal shoe. The seal shoe comprises a plurality of seal shoe segments circumferentially spaced apart from each other. Each seal shoe segment is configured to be movable in a radial direction. The non-contact seal assembly comprises a mid-plate disposed forward to the primary seal. The non-contact seal assembly comprises an aft secondary seal disposed forward to the mid-plate. The aft secondary seal comprises a plurality of aft secondary seal segments circumferentially spaced apart from each other. Each aft secondary seal segment is attached to each seal shoe segment and is configured to be movable in the radial direction along with each seal shoe segment. The non-contact seal assembly comprises a forward secondary seal disposed forward to the aft secondary seal. The non-contact seal assembly comprises a seal carrier comprising an outer ring and a front plate and a back plate. The front plate and the back plate extend circumferentially along the outer ring and radially from two axial sides of the outer ring forming a U-shape. The primary seal, the mid-plate, the aft secondary seal and the forward secondary seal are assembled in the U-shape. The non-contact seal assembly comprises a pin to hold the primary seal, the mid-plate, and the forward secondary seal to the seal carrier between the front plate and the back plate.

According to an aspect, a method for making a non-contact seal assembly to be used for sealing a gap between a stator and a rotor rotatable relative to the stator in a gas turbine engine is presented. The method comprises providing a primary seal comprising a seal shoe. The seal shoe comprises a plurality of seal shoe segments circumferentially spaced apart from each other. Each seal shoe segment is configured to be movable in a radial direction. The method comprises disposing a mid-plate forward to the primary seal. The method comprises disposing an aft secondary seal forward to the mid-plate. The aft secondary seal comprises a plurality of aft secondary seal segments circumferentially spaced apart from each other. Each aft secondary segment is attached to each seal shoe segment and is configured to be movable in the radial direction along with each seal shoe segment. The method comprises disposing a forward secondary seal forward to the aft secondary seal. The method comprises providing a seal carrier comprising an outer ring and a front plate and a back plate. The front plate and the back plate extend circumferentially along the outer ring and radially from two axial sides of the outer ring forming a U-shape. The primary seal, the mid-plate, the aft secondary seal and the forward secondary seal are assembled in the U-shape. The method comprises holding the primary seal, the mid-plate, and the forward secondary seal to the seal carrier between the front plate and the back plate by a pin.

According to an aspect, a gas turbine engine is presented. The gas turbine engine gas turbine engine comprises a stator. The gas turbine engine comprises a rotor rotatable relative to the stator. The gas turbine engine comprises a non-contact seal assembly arranged between the stator and the rotor configured to seal a gap between the stator and the rotor. The non-contact seal assembly comprises a primary seal comprising a seal shoe. The seal shoe comprises a plurality of seal shoe segments circumferentially spaced apart from each other. Each seal shoe segment is configured to be movable in a radial direction. The non-contact seal assembly comprises a mid-plate disposed forward to the primary seal. The non-contact seal assembly comprises an aft secondary seal disposed forward to the mid-plate. The aft secondary seal comprises a plurality of aft secondary seal segments circumferentially spaced apart from each other. Each aft secondary seal segment is attached to each seal shoe segment and is configured to be movable in the radial direction along with each seal shoe segment. The non-contact seal assembly comprises a forward secondary seal disposed forward to the aft secondary seal. The non-contact seal assembly comprises a seal carrier comprising an outer ring and a front plate and a back plate. The front plate and the back plate extend circumferentially along the outer ring and radially from two axial sides of the outer ring forming a U-shape. The primary seal, the mid-plate, the aft secondary seal and the forward secondary seal are assembled in the U-shape. The non-contact seal assembly comprises a pin to hold the primary seal, the mid-plate, and the forward secondary seal to the seal carrier between the front plate and the back plate.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF THE INVENTION

A detailed description related to aspects of the present invention is described hereafter with respect to the accompanying figures.

For illustration purpose, term "axial" or "axially" refers to a direction along a longitudinal axis of a gas turbine engine, term "radial" or "radially" refers to a direction perpendicular to the longitudinal axis of the gas turbine engine, term "downstream" or "aft" refers to a direction along a flow direction, term "upstream" or "forward" refers to a direction against the flow direction.

Figure 1:
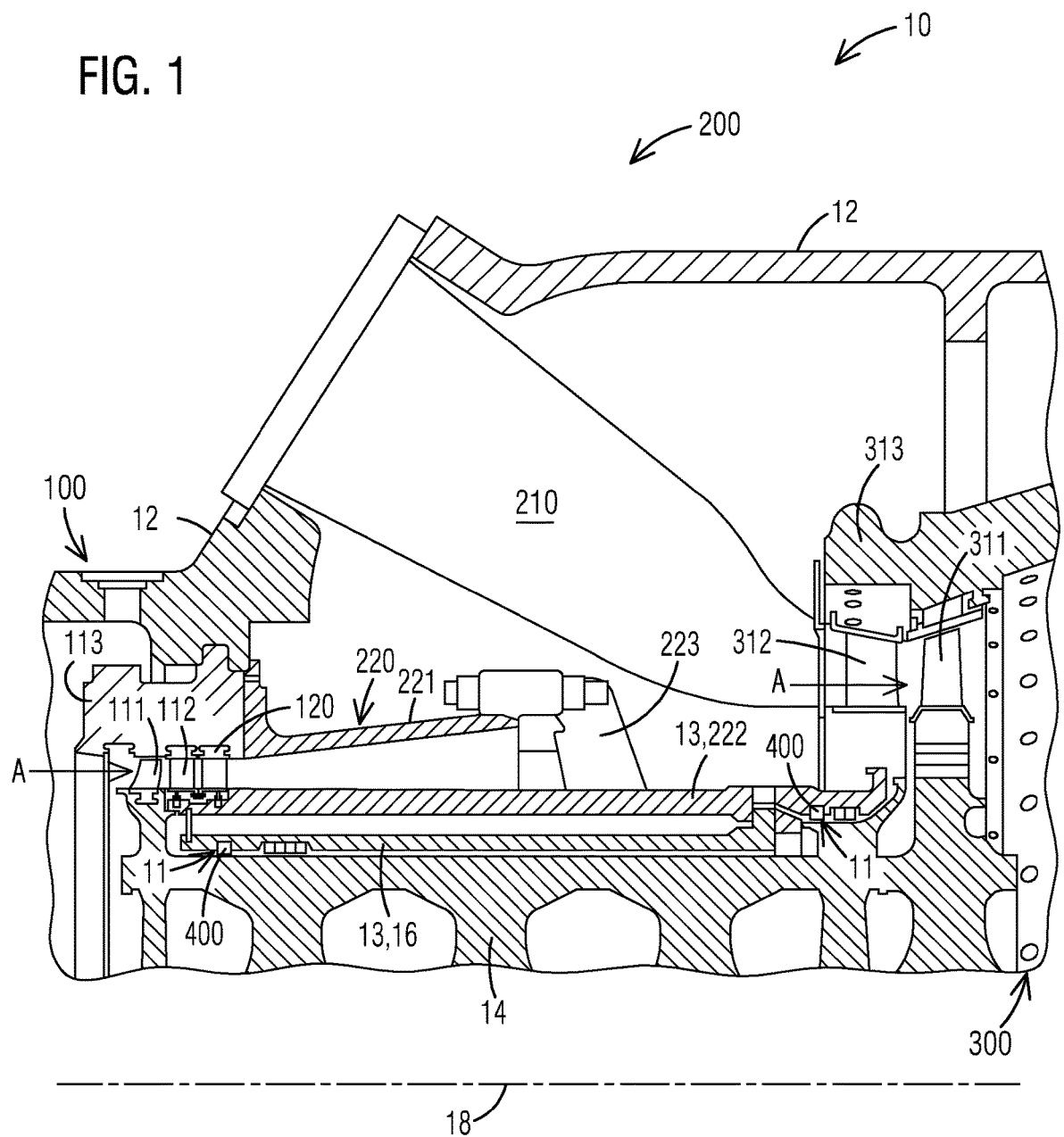
FIG. 1 is a schematic longitudinal section view of a portion of a gas turbine engine according to an embodiment of the present invention.

FIG. 1 illustrates a schematic longitudinal section view of a portion of a gas turbine engine 10. As illustrated in FIG. 1, the gas turbine engine 10 includes a plurality of components along a longitudinal axis 18. The plurality of components may include a compressor section 100, a turbine section 300 located downstream of the compressor section 100 with respect to a flow direction A, and a mid-frame section 200 that is located there between. The gas turbine engine 10 also includes an outer casing 12 that encloses the plurality of components. A rotor 14 longitudinally connects the compressor section 100, the mid-frame section 200 and the turbine section 300 and is circumferentially enclosed thereby. The rotor 14 may be partially or fully enclosed by a shaft cover 16.

The compressor section 100 includes multiple stages of compressor rotating blades 111 and compressor stationary vanes 112. FIG. 1 only shows the last stage of compressor rotating blade 111 and compressor stationary vane 112. An outlet guide vane assembly 120 is arranged downstream of the last stage compressor vane 112. The compressor blades 111 are installed into the rotor 14. The compressor vanes 112 and the outlet guide vane assembly 120 are installed into a compressor vane carrier 113. The compressor vane carrier 113 interfaces with the outer casing 12. The turbine section 300 includes multiple stages of turbine stationary vanes 312 and turbine rotating blades 311. FIG. 1 only shows the first stage of turbine stationary vane 312 and turbine rotating blade 311. The turbine vanes 312 are installed into a turbine vane carrier 313. The turbine vane carrier 313 interfaces with the outer casing 12. The turbine blades 311 are installed into the rotor 14. The mid-frame section 200 typically includes a combustor assembly 210 and a compressor exit diffuser 220. The compressor exit diffuser 220 is located downstream of the outlet guide vane assembly 120.

The compressor exit diffusor 220 typically includes an outer compressor exit diffusor 221 and an inner compressor exit diffusor 222. The outer compressor exit diffusor 221 is connected to the inner compressor exit diffusor 222 by bolting to a strut 223. The inner compressor exit diffusor 222 may enclose the shaft cover 16. Forward side of the outer compressor exit diffusor 221 interfaces with the outer casing 12. Forward side of the inner compressor exit diffusor 222 interfaces with the last stage compressor vane 112 and the outlet guide vane assembly 120.

In operation of the gas turbine engine 10, the compressor section 100 inducts air via an inlet duct (not shown). The air is compressed and accelerated in the compressor section 100 while passing through the multiple stages of compressor rotating blades 111 and compressor stationary vanes 112, as indicated by the flow direction A. The compressed air passes through the outlet guide vane assembly 120 and enters the compressor exit diffuser 220. The compressor exit diffuser 200 diffuses the compressed air to the combustor assembly 210. The compressed air is mixed with fuel in the combustor assembly 210. The mixture is ignited and burned in the combustor assembly 210 to form a combustion gas. The combustion gas enters the turbine section 300, as indicated by the flow direction A. The combustion gas is expanded in the turbine section 300 while passing through the multiple stages of turbine stationary vanes 312 and turbine rotating blades 311 to generate mechanical power which drives the rotor 14. The rotor 14 may be linked to an electric generator (not shown) to convert the mechanical power to electrical power. The expanded gas constitutes exhaust gas and exits the gas turbine engine 10.

In operation of the gas turbine engine 10, due to the high temperature of the combustion gas, cooling air is used to cool the turbine blades 311 and vanes 312 to maintain an adequate component life. Cooling air may leak at gaps or clearances between components. Cooling air leakage may negatively affect the performance and efficiency of the gas turbine engine 10. The gas turbine engine 10 may include seals to reduce the cooling air leakage.

According to embodiments of the present invention, the gas turbine engine 10 may include a non-contact seal assembly 400 to reduce the cooling air leakage at a clearance between two components of the gas turbine engine 10. The two components may relatively rotate with respect to each other. As shown in the exemplary embodiment of FIG. 1, the non-contact seal assembly 400 is arranged at a stator 13, such as the stationary shaft cover 16 or the stationary inner compressor exit diffusor 222, to reduce cooling air leakage at a gap 11 between the stator 13 and the rotating rotor 14. The gap 11 extends in a radial direction and circumferentially around between the stator 13 and rotor 14. It is understood that the non-contact seal 400 may be arranged at a rotating component, such as the rotor 14. As shown in the exemplary embodiment of FIG. 1, one non-contact seal assembly 400 is arranged at a forward side of the stationary shaft cover 16. Another non-contact seal assembly 400 is arranged at an aft side of the stationary inner compressor exit diffusor 222. It is understood that the non-contact seal assembly 400 may be arranged at any locations of the gas turbine engine 10 where cooling air leakages may occur.

Figure 2:
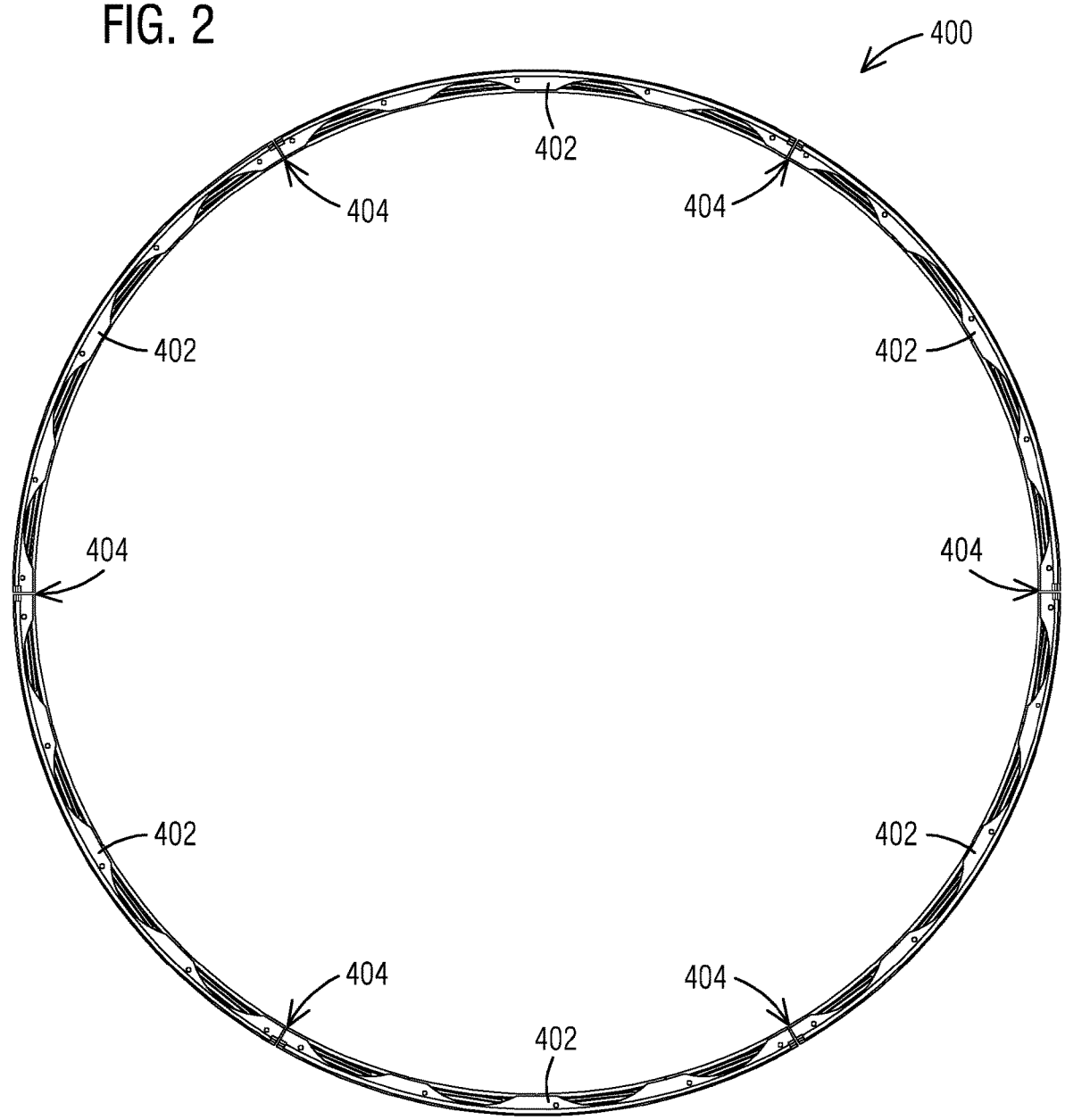
FIG. 2 is a schematic end view of a non-contact seal assembly according to an embodiment of the present invention.

FIG. 2 shows a schematic end view of a non-contact seal assembly 400 according to an embodiment. As shown in FIG. 2, the non-contact seal assembly 400 includes a plurality of non-contact seal segments 402. The non-contact seal segments 402 are circumferentially arranged to seal a gap 11 between two components in the gas turbine engine 10. A small gap 404 may exist between adjacent non-contact seal segments 402. The gap 404 may be used to adapt thermal expansion and/or tolerance of manufacture and assembly. As shown in the exemplary embodiment of FIG. 2, the non-contact seal assembly 400 includes six 60-degree non-contact seal segments 402. It is understood that the non-contact seal assembly 400 may include any numbers of non-contact seal segments 402 to form a circular seal.

Figure 3:
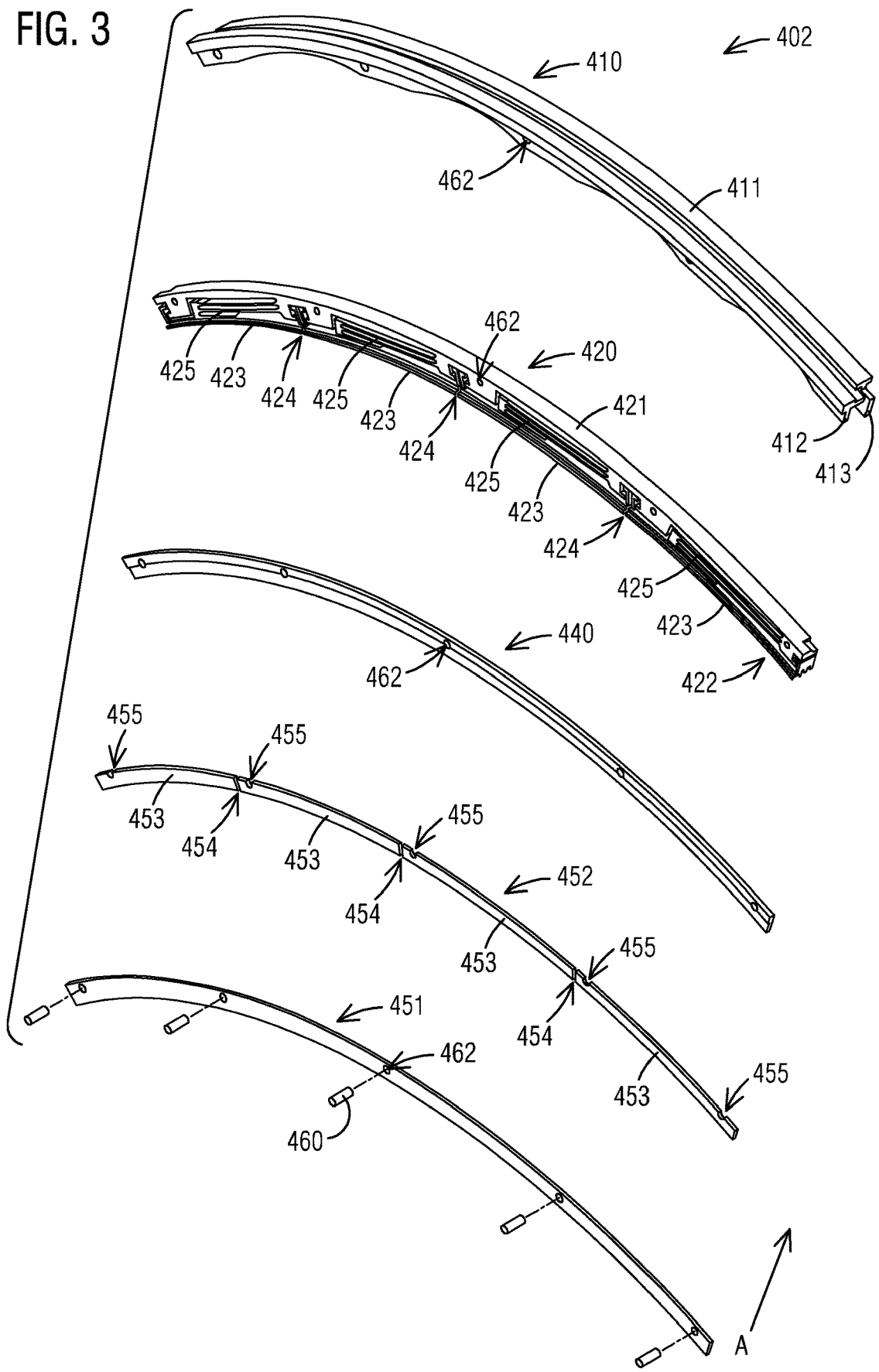
FIG. 3 is a schematic perspective exploded view of a non-contact seal segment according to an embodiment of the present invention.

The non-contact seal segment 402 of the non-contact seal assembly 400 includes a plurality of components. FIG. 3 shows a schematic perspective exploded view of a non-contact seal segment 402 of the non-contact seal assembly 400 according to an embodiment. As shown in FIG. 3, the non-contact seal segment 402 includes a seal carrier 410. The seal carrier 410 includes an outer ring 411, a front plate 412 and a back plate 413. The front plate 412 and the back plate 413 extend circumferentially along the outer ring 411 and radially from two axial ends of the outer ring 411 forming a U-shaped seal ring carrier 410 (better shown in FIG. 5). The front plate 412 may have a wave shape to allow for the passage of air. The front plate 412, the back plate 413 and the outer ring 411 may be integrally formed as a single piece. The front plate 412 and the back plate 413 include a plurality of circumferentially spaced pin holes 462 for receiving a plurality of pins 460.

The non-contact seal segment 402 includes a primary seal 420. The primary seal 420 includes a seal base 421 and a seal shoe 422 arranged at an inner radial side. The seal shoe 422 includes a plurality of circumferentially spaced seal shoe segments 423. A small gap 424 may exist between adjacent seal shoe segments 423. The gap 424 may be used to adapt thermal expansion and/or tolerance of manufacture and assembly. As shown in the exemplary embodiment of FIG. 3, the non-contact seal segment 402 includes four 15-degree seal shoe segments 423. It is understood that the non-contact seal segment 402 may include any numbers of seal shoe segments 423. The non-contact seal segment 402 includes a plurality of circumferentially spaced seal springs 425. Each seal spring 425 is connected to each seal shoe segment 423. Each seal spring 425 includes at least two seal beams 426 radially spaced apart from each other (shown in FIG. 6). Slot 427 exist between the seal beams 426. Slots 427 exist between the seal beams 426 and the seal base 421 and the seal shoe 422.

In operation of the gas turbine engine 10, aerodynamic loads are developed which apply a fluid pressure to the seal shoe 422 causing the seal shoe 422 to move radially inwardly and outwardly with respect to the rotor 14. Each seal shoe segment 423 moves independently to adjacent seal shoe segments 423. Each seal spring 425 deflects and moves radially inwardly and outwardly with each seal shoe segment 423. The radial movement of the seal shoe 422 with respect to the rotor 14 creates a primary seal reducing cooling air flow through the gap 11 between the rotor 14 and the stator 13 within a predetermined design clearance. The predetermined design clearance between the rotor 14 and the stator 13 may be less than 0.8 mm due to a pressure gradient between the forward side pressure zone and the aft side pressure zone of primary seal 420. The non-contact seal assembly 400 thus provides sufficient sealing between the rotor 14 and the stator 13. The seal base 421 includes a plurality of circumferentially spaced pin holes 462 for receiving the plurality of pins 460.

Referring to FIG. 3, the non-contact seal segment 402 includes a mid-plate 440 disposed forward to the primary seal 420. The non-contact seal segment 402 includes an aft secondary seal 452 disposed forward to the mid-plate 440 and a forward secondary seal 451 disposed forward to the aft secondary seal 452. The mid-plate 440 and the forward secondary seal 451 include a plurality of circumferentially spaced pin holes 462 for receiving the plurality of pins 460. For illustration purpose, only one forward secondary seal 451 is illustrated in FIG. 3. It is understood that the non-contact seal segment 402 may include more than one forward secondary seals 451 placed side by side in the axial direction.

The aft secondary seal 452 includes a plurality of circumferentially spaced aft secondary seal segments 453. The number of aft secondary seal segments 453 may correspond to the number of seal shoe segments 423. A small gap 454 exists between adjacent aft secondary seal segments 453. The gap 454 may be used to adapt thermal expansion and/or tolerance of manufacture and assembly. The gap 454 between adjacent aft secondary seal segments 453 may align with the gap 424 between adjacent seal shoe segments 423. Each aft secondary seal segment 442 aligns with and is attached to each seal shoe segment 422. As shown in the exemplary embodiment of FIG. 3, the aft secondary seal 452 includes four 15-degree aft secondary seal segments 453. Each aft secondary seal segment 453 includes at least a notch 455 at outer radial side. Circumferential locations of the notches 455 correspond to circumferential locations of the pin holes 462.

In operation of the gas turbine engine 10, each aft secondary seal segment 453 moves radially inwardly and outwardly with each seal shoe segment 423 independently to adjacent aft secondary seal segments 453 in response to the application of fluid pressure as noted above. The aft secondary seal 452 thus creates a secondary seal reducing cooling air flow through slots 427 between the seal beams 426 and between the seal beams 426 and the seal base 421 and the seal shoe 422 of the primary seal 420. The aft secondary seal 452 seals the slots 427 in the primary seal 420 and separates the forward side high pressure zone from the aft side low pressure zone of the primary seal 420 while undergoing constant motion along with the seal shoe 422. The pressure gradient between the forward side pressure zone and the aft side pressure zone of the primary seal 420 is thus maintained which allows the primary seal 420 self-adjusting its positioning and creating the primary seal in the gap 11 between the rotor 14 and the stator 13 within the predetermined design clearance during operation of the gas turbine engine 10.

Figure 4:
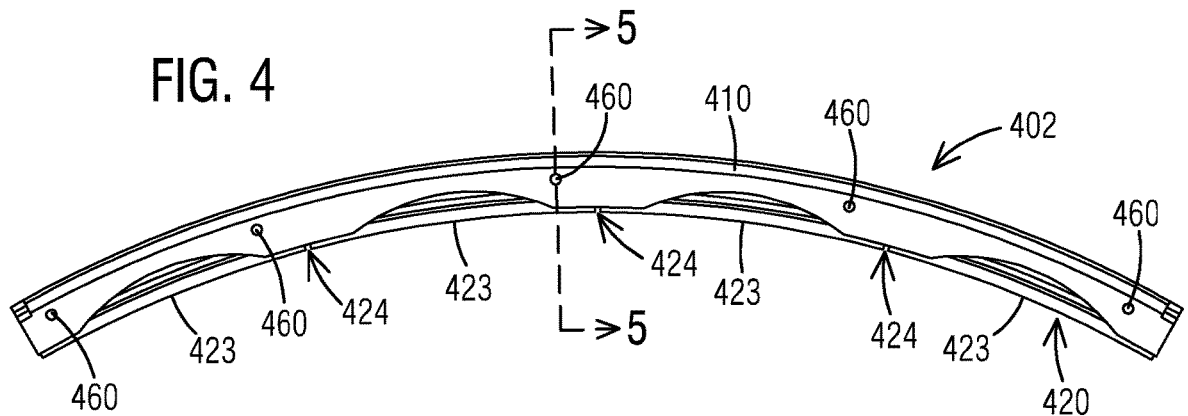
FIG. 4 is a schematic assembled end view of the non-contact seal segment as shown in FIG. 3 according to an embodiment of the present invention.

FIG. 4 shows a schematic assembled end view of the non-contact seal segment 402 of the non-contact seal assembly 400. As illustrated in the exemplary embodiment of FIG. 4, components of the non-contact seal assembly 400 including the forward secondary seal 451, the aft secondary seal 452, the mid-plate 440, and the primary seal 420 are assembled to the seal carrier 410 into the U-shape between the front plate 412 and the back plate 413. The plurality of pins 460 extend axially passing through the pin holes 462 to hold the components together to the seal carrier 410 between the front plate 412 and the back plate 413.

Figure 5:
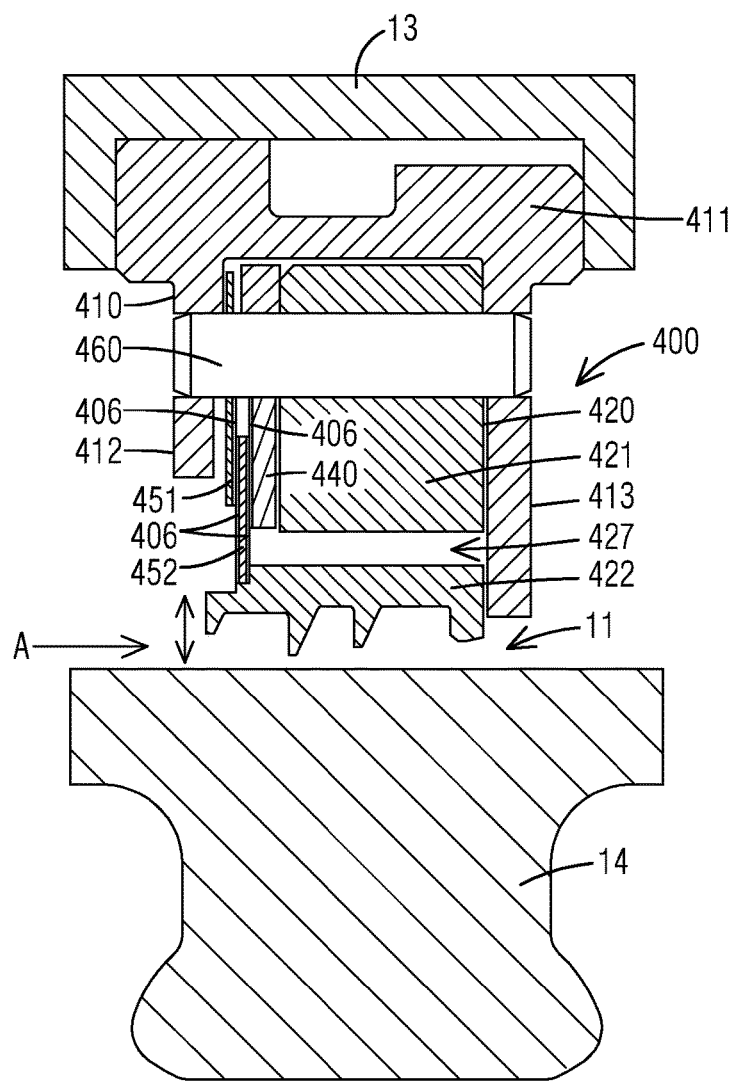
FIG. 5 is a schematic cross section view of the non-contact seal assembly taking along a section line 5-5 in FIG. 4 according to an embodiment of the present invention.

FIG. 5 shows a schematic cross section view of the non-contact seal assembly 400 looking along 5-5 of the non-contact seal segment 402 in FIG. 4. As shown in FIG. 5, the non-contact seal assembly 400 is mounted on a stator 13 of the gas turbine engine 10. The stator 13 may be the shaft cover 16 or the inner compressor exit diffusor 222. The non-contact seal assembly 400 is used to reduce cooling air leakage at a gap 11 between the stator 13 and the rotating rotor 14. As shown in FIG. 5, the primary seal 420, the mid-plate 440, the aft secondary seal 452, and the forward secondary seal 451 are assembled into the U-shaped seal carrier 410 between the front plate 412 and the back plate 413. The seal shoe 422 of the primary seal 420 is located at a non-contact location along the exterior surface of the rotor 14. The forward secondary seal 451, the mid-plate 440 and the primary seal 420 are held together to the seal carrier 410 between the front plate 412 and the back plate 413 by the pin 460. The aft secondary seal 452 is attached to the seal shoe 422 of the primary seal 420. The aft secondary seal 452 may be attached to the seal shoe 422 by welding, such as laser welding. The aft secondary seal 452 may be attached to the seal shoe 422 by any other techniques known in the industries, such as caulking, brazing, etc.

As shown in the exemplary embodiment of FIG. 5, the forward secondary seal 451 is positioned more radially outwardly by the pin 460 than the aft secondary seal 452 attached to the seal shoe 422. The forward secondary seal 451 at least partially overlap the aft secondary seal 452 in the radial direction to partially cover the gaps 454 between the aft secondary seal segments 453. The aft secondary seal 452 may thus provide sufficient sealing and separation of the forward side high pressure zone from the aft side low pressure zone of the primary seal 420 when the aft secondary seal 452 moves radially inwardly and outwardly along with the seal shoe 420. Such arrangement may thus eliminate using spring members for pre-loading the secondary seals 451 and 452 to the primary seal 420. Spring members, such as whiskers, for pre-loading the secondary seals 451 and 452 to the primary seal 420 tend to crack under constant high cycle fatigue loading. By attaching the aft secondary seal 452 to the seal shoe 422, the aft secondary seal 452 does not require spring element for initial pre-loading and reduces risk of high cycle fatigue failures.

Figure 6:
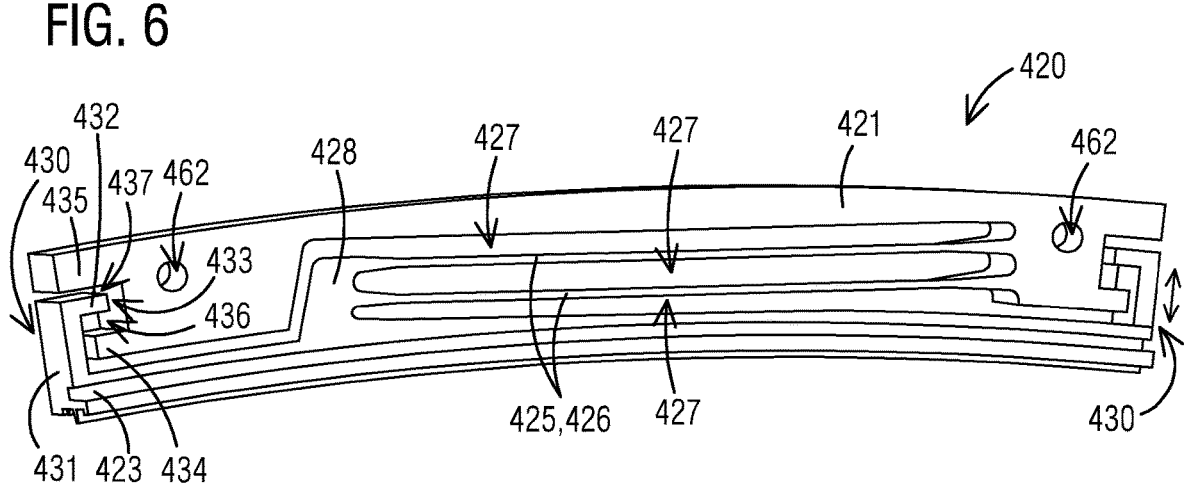
FIG. 6 is a schematic perspective view of a portion of a primary seal of a non-contact seal assembly according to an embodiment of the present invention.

FIG. 6 shows a schematic perspective view of a portion of the primary seal 420 of the non-contact seal assembly 400. As shown in FIG. 6, the primary seal 420 includes a seal base 421, a seal shoe segment 423 and a seal spring 425. The seal spring 425 includes at least one seal beam 426. In the exemplary embodiment shown in FIG. 6, the seal spring 425 includes two seal beams 426 radially spaced apart from each other. The seal beams 426 are formed by cutting out a plurality of slots 427 from the seal base 421, for example, slots 427 between the seal beams 426 and between the seal beams 426 and the seal base 421 and the seal shoe segment 423. One end of the seal beams 426 is mounted to or integrally formed with the seal base 421. The other end of the seal beams 426 is mounted to or integrally formed with a seal strip 428. The seal strip 428 extends radially downwardly and is mounted or integrally formed with the seal shoe segment 423. The seal shoe segment 423 includes two seal stops 430 located at two circumferential ends. Each seal stop 430 includes a stop leg 431 and a stop arm 432. The seal base 421 has a recess 433 to receive the stop arm 432. The recess 433 includes an inner shoulder 434 and an outer shoulder 435. Gap 436 exists between the stop arm 432 and the inner shoulder 434. Gap 437 exists between the stop arm 432 and the outer shoulder 435.

Referring to FIGS. 5 and 6, in operation of the gas turbine engine 10, aerodynamic loads are developed which apply a fluid pressure to each seal shoe segment 423 of the seal shoe 422 causing the seal shoe segment 423 to move radially inwardly and outwardly with respect to the rotor 14, as indicated by the dual arrows. The seal beams 426 of the seal spring 425 deflect and move with the seal shoe 422 to create a primary seal of the gap 11 between the rotor 14 and the stator 13 within a predetermined design tolerance.

Figure 7:
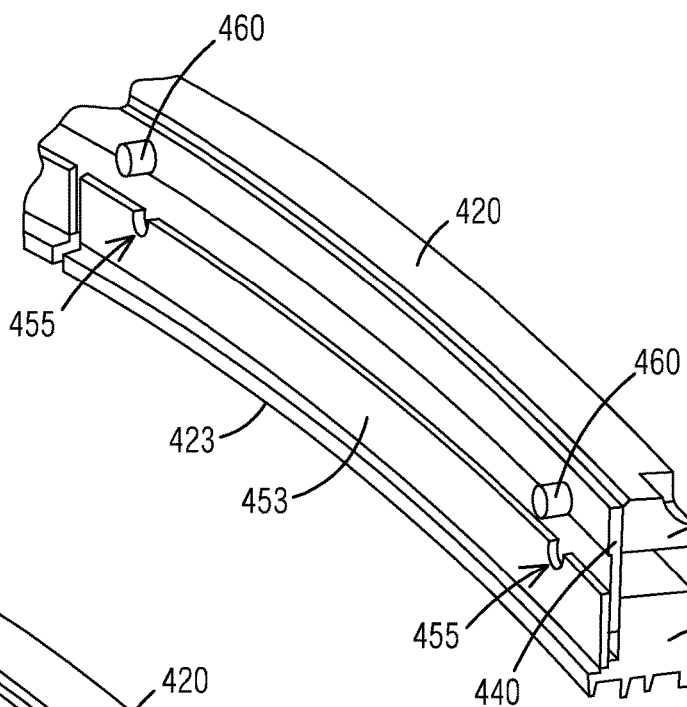
FIG. 7 is a schematic perspective view of a portion of a non-contact seal assembly with an aft secondary seal segment in the maximum radially inward position according to an embodiment of the present invention.
Figure 8:
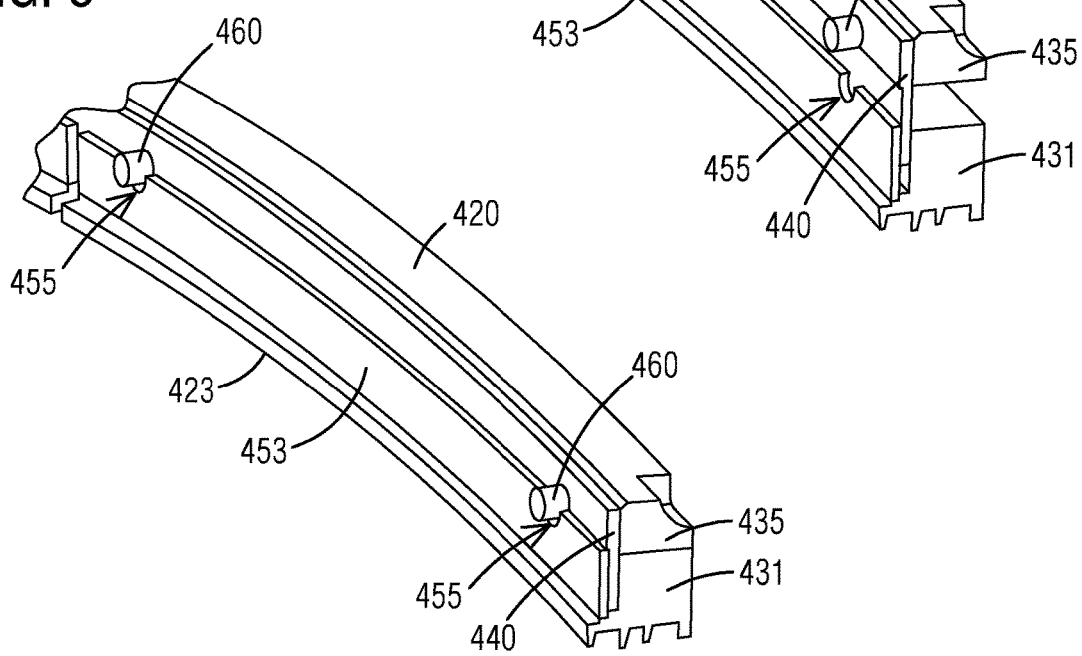
FIG. 8 is a schematic perspective view of a portion of a non-contact seal assembly with an aft secondary seal segment in the maximum radially outward position according to an embodiment of the present invention.

The seal stops 430 define the maximum extent of the radially inward and outward movement of the seal shoe segment 423 with respect to the rotor 14 for safety and operational consideration. The radial inward movement of the seal shoe segment 423 is limited by engagement of the stop arm 432 with the inner shoulder 434 thus closing the gap 436 between the stop arm 432 and the inner shoulder 434, as illustrated in FIG. 7. The radial inward movement limitation of the seal shoe 422 reduces the likelihood of contact between the seal shoe 422 and the rotor 14 or exceeding the predetermined design tolerance for the gap 11 between the rotor 14 and the stator 13. The radial outward movement of the seal shoe segment 423 is limited by engagement of the stop arm 432 with the outer shoulder 435 thus closing the gap 437 between the stop arm 432 and the outer shoulder 435, as illustrated in FIG. 8.

Each aft secondary seal segment 453 of the aft secondary seal 452 includes at least a notch 455 at the outer radial side to accommodate the radial movement of each seal shoe segment 423. As shown in the exemplary embodiments of FIGS. 7 and 8, the notch 455 of the aft secondary seal segment 453 is cut downwardly from the outer radial side of the aft secondary seal segment 453. A circumneutral location of the notch 455 may correspond to a circumferential location of the pin 460 after assembled into the pin hole 462. As shown in FIG. 8, the notch 455 receives the pin 460 when the seal shoe segment 423 moves to the maximum radially outward location to accommodate the radial movement of the seal shoe segment 423. The notch 455 may thus reduce the risk of failure of the aft secondary seal 452 due to the radial movement of the seal shoe segment 423 in operation of the gas turbine engine 10.

Figure 9:
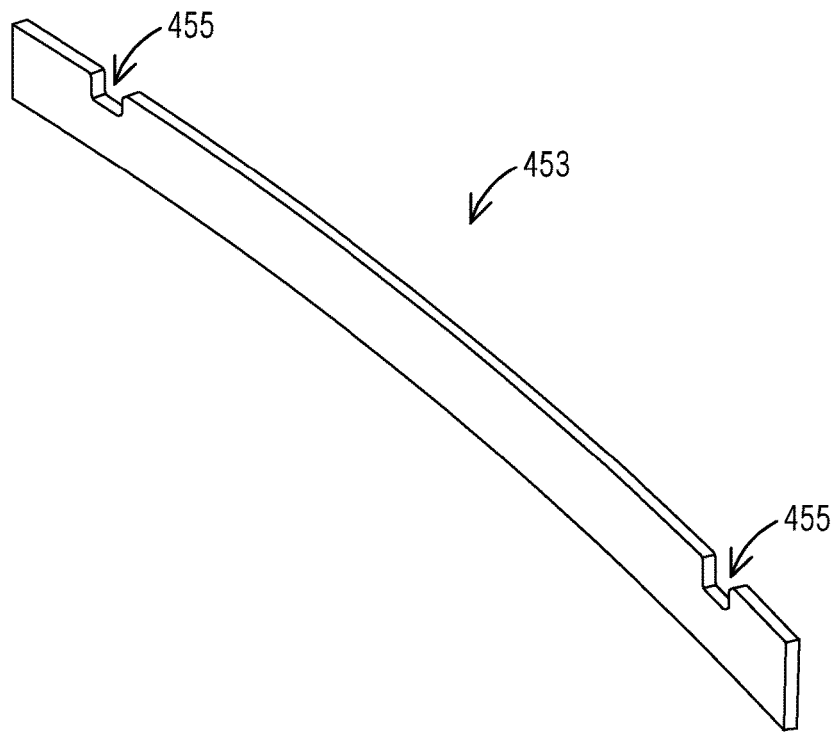
FIG. 9 is a schematic perspective view of an aft secondary seal segment of a non-contact seal assembly according to an embodiment of the present invention.

The notch 455 may have any types of shape. As shown in FIGS. 7 and 8, the notch 455 has an arc shape. As shown in an exemplary embodiment of FIG. 9, the aft secondary seal segment 453 has a U-shaped notch 455. Dimension of the notch 455 is larger than dimension of the pin 460 to allow relative movement between the notch 455 and the pin 460 and manufacture and assembly tolerance.

Figure 10:
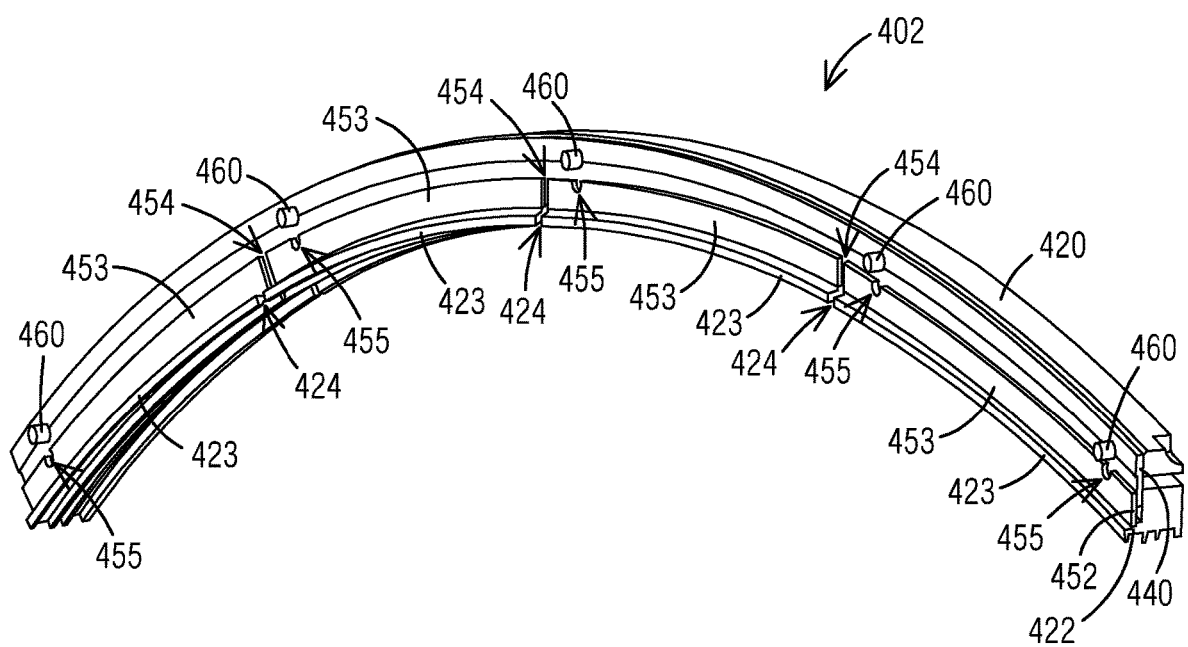
FIG. 10 is a schematic perspective view of a non-contact seal segment according to an embodiment of the present invention.

FIG. 10 illustrates a schematic perspective view of a non-contact seal segment 402 of a non-contact seal assembly 400. As illustrated in the exemplary embodiment of FIG. 10, the non-contact seal segment 402 includes a primary seal 420 and a mid-plate 440 attached to the primary seal 420. The primary seal 420 includes a seal shoe 422 including four seal shoe segments 423. The non-contact seal segment 402 includes an aft secondary seal 452 attached to the seal shoe 422. The aft secondary seal 422 includes four aft secondary seal segments 423. Each aft secondary seal segment 423 aligns with each seal shoe segment 423 and is attached to each seal shoe segment 423. Circumferential dimension of each aft secondary seal segment 453 corresponds to circumferential dimension of each seal shoe segment 423. Gaps 424 between adjacent seal shoe segments 423 aligns with gaps 454 between adjacent aft secondary seal segments 453. Each aft secondary seal segment 453 includes at least a notch 455 at the outer radial side. As show in FIG. 10, each seal shoe segment 423 moves radially independently to adjacent seal shoe segments 423 in response to an aerodynamic load. Each aft secondary seal segment 453 moves radially independently to adjacent aft secondary seal segments 453 along with the seal shoe segment 423. The notch 455 receives the pin 460 when the seal shoe segment 423 moves to the maximum radially outward position to accommodate the radial outward movement of the seal shoe segment 423.

The non-contact seal segment 402 may be a 60-degree segment. The primary seal 420 of each non-contact seal segment 402 may include four 15-degree seal shoe segments 423. The aft secondary seal 422 of each non-contact seal segment 402 may include four 15-degree aft secondary seal segments 423. The non-contact seal assembly 400 may include six 60-degree non-contact seal segments 402.

According to an embodiment, material may be applied to regions of the non-contact seal assembly 400 that are prone to fatigue failure to improve mechanical properties of the non-contact seal assembly 400 against fatigue failure in operation of the gas turbine engine 10. Such regions include sliding surfaces of components that move relatively to each other in operation of the gas turbine engine 10. Material may be applied as bulk material to at least one of the relatively moving components in a desired concentration during manufacturing process. Alternatively, material may be applied as a coating layer to at least one adjacent sliding surface of the relatively moving components. The material may include carbon structures (for example, carbon nanotubes, graphene, fullerene, etc.), ceramic, or any types of high strength materials known in the industrial. The material may be applied to the components or the adjacent sliding surface by additive manufacturing, laser injection, or any types of techniques known in the industrial.

Referring to FIG. 5, the aft secondary seal 452 moves radially relative to the mid-plate 440 and the forward secondary seal 451. The material may be applied as bulk material to the aft secondary seal 452, and/or to the mid-plate 440, and/or to the forward secondary seal 451. The material may be applied as a coating layer 406 to at least one adjacent surface between the aft secondary seal 452 and the mid-plate 440. The material may also be applied as a coating layer 406 to at least one adjacent surface between the aft secondary seal 452 and the forward secondary seal 451. As illustrated in the exemplary embodiment of FIG. 5, the coating layer 406 is applied to a surface of the aft secondary seal 452 facing to the mid-plate 440 and a surface of the mid-plate 440 facing to the aft secondary seal 452. The coating layer 406 is applied to a surface of the aft secondary seal 452 facing to the forward secondary seal 451 and a surface of the forward secondary seal 451 facing to the aft secondary seal 452. It is understood that the coating layer 406 may be applied to one adjacent surface between the aft secondary seal 452 and the mid-plate 440 and/or one adjacent surface between the aft secondary seal 452 and the forward secondary seal 451. The coating layer 406 may be applied to the adjacent surface to a radial extent that covers the maximum radial movement in operation of the gas turbine engine 10. The coating layer 406 may also be applied to the entire radial length of the adjacent surface. As shown in FIG. 5, the coating layer 406 is applied to the entire radial length of the surface of the aft secondary seal 452. The coating layers 406 are applied to the surfaces of the mid-plate 440 and the forward secondary seal 451 up to radial position of the pin 460.

According to an aspect, the proposed non-contact seal assembly 400 provides a robust non-contact seal assembly 400 in a gas turbine engine 10. The proposed non-contact seal assembly 400 segments the seal shoe 422 and the aft secondary seal 452. Each aft secondary seal segment 453 is attached to each seal shoe segment 423. The proposed non-contact seal assembly 400 thus eliminates spring elements for pre-loading the secondary seals 452. The proposed non-contact seal assembly 400 may withstand infinite high cycle fatigue loading.

According to an aspect, the proposed non-contact seal assembly 400 allows each aft secondary seal segments 453 moves radially independently along with each seal shoe segments 423 in response to the aerodynamic loads. Each aft secondary seal segment 453 provides an independent secondary sealing and separates the forward high pressure zone from the aft low pressure zone of the primary seal 420 while undergoing constant radial movements along with the seal shoe segments 423.

According to an aspect, each aft secondary seal segment 453 includes at least one notch 455 at the outer radial side. The notch 455 may receive the pin 460 when the seal shoe segment 423 moves to the maximum radially outward position to accommodate the large radial movement of the seal shoe segment 423 in operation of the large gas turbine engine 10.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

10: Gas Turbine Engine
11: Gap between Stator and Rotor

12: Outer Casing
13: Stator
14: Rotor
16: Shaft Cover
18: Longitudinal Axis
100: Compressor Section
111: Compressor Blade
112: Compressor Vane
113: Compressor Vane Carrier
120: Outlet Guide Vane Assembly
200: Mid-Frame Section
210: Combustor Assembly
220: Compressor Exit Diffusor
221: Outer Compressor Exit Diffusor
222: Inner Compressor Exit Diffusor
223: Strut
300: Turbine Section
311: Turbine Blade
312: Turbine Vane
313: Turbine Vane Carrier
400: Non-contact Seal Assembly
402: Non-contact Seal Segment
404: Gap between Seal segments
406: Coating Layer
410: Seal Carrier
411: Outer Ring of Seal Carrier
412: Front Plate of Seal Carrier
413: Back Plate of Seal Carrier
420: Primary Seal
421: Primary Seal Base
422: Seal Shoe
423: Seal Shoe Segment
424: Gap between Seal Shoe Segments
425: Seal Spring
426: Seal Beam
427: Slot on Primary Seal Base
428: Seal Strip
430: Seal Stop
431: Stop Leg
432: Stop Arm
433: Recess of Primary Seal Base
434: Inner Shoulder
435: Outer Shoulder
436: Gap between Seal Arm to Inner Shoulder
437: Gap between Seal Arm to Outer Shoulder
440: Mid-Plate
451: Forward Secondary Seal
452: Aft Secondary Seal
453: Aft Secondary Seal Segment
454: Gap between Aft Secondary Seal Segments
455: Notch on Aft Secondary Seal
460: Pin
462: Pin Hole

What is claimed is:

1. A non-contact seal assembly configured to seal a gap between a stator and a rotor rotatable relative to the stator in a gas turbine engine comprising:
a primary seal comprising a seal shoe, wherein the seal shoe comprises a plurality of seal shoe segments circumferentially spaced apart from each other, and wherein each seal shoe segment is configured to be movable in a radial direction;
a mid-plate disposed forward to the primary seal;
an aft secondary seal disposed forward to the mid-plate, wherein the aft secondary seal comprises a plurality of aft secondary seal segments circumferentially spaced apart from each other, and wherein each aft secondary seal segment is attached to a respective seal shoe segment of the plurality of seal shoe segments and is configured to be movable in the radial direction along with each seal shoe segment;
a forward secondary seal disposed forward to the aft secondary seal;
a seal carrier comprising an outer ring and a front plate and a back plate, wherein the front plate and the back plate extend circumferentially along the outer ring and radially from two axial sides of the outer ring forming a U-shape, and wherein the primary seal, the mid-plate, the aft secondary seal and the forward secondary seal are assembled in the U-shape; and
a pin to hold the primary seal, the mid-plate, and the forward secondary seal to the seal carrier between the front plate and the back plate,
wherein each aft secondary seal segment comprises at least a notch at an outer radial side, and wherein the notch is configured to receive the pin for accommodating a radial movement of the respective seal shoe segment of the plurality of seal shoe segments.

2. The non-contact seal assembly as claimed in claim 1, wherein the notch comprises an arc shape.

3. The non-contact seal assembly as claimed in claim 1, wherein the notch comprises a U-shape.

4. The non-contact seal assembly as claimed in claim 1, wherein the forward secondary seal is positioned at least partially overlapping the aft secondary seal in the radial direction.

5. The non-contact seal assembly as claimed in claim 1, wherein an adjacent surface between each aft secondary seal segment and the mid-plate comprises a coating layer.

6. The non-contact seal assembly as claimed in claim 1, wherein an adjacent surface between each aft secondary seal segment and the forward secondary seal comprises a coating layer.

7. The non-contact seal assembly as claimed in claim 1, further comprising a plurality of non-contact seal segments.

8. A method for making a non-contact seal assembly to be used for sealing a gap between a stator and a rotor rotatable relative to the stator in a gas turbine engine comprising:
providing a primary seal comprising a seal shoe, wherein the seal shoe comprises a plurality of seal shoe segments circumferentially spaced apart from each other, and wherein each seal shoe segment is configured to be movable in a radial direction;
disposing a mid-plate forward to the primary seal;
disposing an aft secondary seal forward to the mid-plate, wherein the aft secondary seal comprises a plurality of aft secondary seal segments circumferentially spaced apart from each other, and wherein each aft secondary seal segment is attached to a respective seal shoe segment of the plurality of seal shoe segments and is configured to be movable in the radial direction along with each seal shoe segment;
disposing a forward secondary seal forward to the aft secondary seal;
providing a seal carrier comprising an outer ring and a front plate and a back plate, wherein the front plate and the back plate extend circumferentially along the outer ring and radially from two axial sides of the outer ring forming a U-shape, and wherein the primary seal, the mid-plate, the aft secondary seal and the forward secondary seal are assembled in the U-shape;
holding the primary seal, the mid-plate, and the forward secondary seal to the seal carrier between the front plate and the back plate by a pin; and providing at least a notch at an outer radial side of each aft secondary seal segment, wherein the notch is configured to receive the pin for accommodating a radial movement of the respective seal shoe segment of the plurality of seal shoe segments.

9. The method as claimed in claim 8, further comprising positioning the forward secondary seal at least partially overlapping the aft secondary seal in the radial direction.

10. The method as claimed in claim 8, further comprising applying a coating layer to an adjacent surface between each aft secondary seal segment and the mid-plate.

11. The method as claimed in claim 8, further comprising applying a coating layer to an adjacent surface between each aft secondary seal segment and the forward secondary seal.

12. The method as claimed in claim 8, further comprising segmenting the non-contact seal assembly to a plurality of non-contact seal segments.

13. A gas turbine engine comprising:
a stator;
a rotor rotatable relative to the stator; and
a non-contact seal assembly arranged between the stator and the rotor configured to seal a gap between the stator and the rotor,
wherein the non-contact seal assembly comprises:
a primary seal comprising a seal shoe, wherein the seal shoe comprises a plurality of seal shoe segments circumferentially spaced apart from each other, and wherein each seal shoe segment is configured to be movable in a radial direction;
a mid-plate disposed forward to the primary seal;
an aft secondary seal disposed forward to the mid-plate, wherein the aft secondary seal comprises a plurality of aft secondary seal segments circumferentially spaced apart from each other, and wherein each aft secondary seal segment is attached to a respective seal shoe segment of the plurality of seal shoe segments and is configured to be movable in the radial direction along with each seal shoe segment;
a forward secondary seal disposed forward to the aft secondary seal;
a seal carrier comprising an outer ring and a front plate and a back plate, wherein the front plate and the back plate extend circumferentially along the outer ring and radially from two axial sides of the outer ring forming a U-shape, and wherein the primary seal, the mid-plate, the aft secondary seal and the forward secondary seal are assembled in the U-shape; and
a pin to hold the primary seal, the mid-plate, and the forward secondary seal to the seal carrier between the front plate and the back plate,
wherein each aft secondary seal segment comprises at least a notch at an outer radial side, and wherein the notch is configured to receive the pin for accommodating a radial movement of the respective seal shoe segment of the plurality of seal shoe segments.

14. The gas turbine as claimed in claim 13, wherein the forward secondary seal is positioned at least partially overlapping the aft secondary seal in the radial direction.

15. The gas turbine as claimed in claim 13, wherein an adjacent surface between each aft secondary seal segment and the mid-plate comprises a coating layer.

16. The gas turbine as claimed in claim 13, wherein an adjacent surface between each aft secondary seal segment and the forward secondary seal comprises a coating layer.

17. The gas turbine as claimed in claim 13, wherein the non-contact seal assembly comprises a plurality of non-contact seal segments.

\* \* \* \* \*